United States Patent
Barbera

(10) Patent No.: US 9,406,245 B2
(45) Date of Patent: Aug. 2, 2016

(54) PATIENT MEDICINE IDENTITY DISPLAY

(71) Applicant: Michael Barbera, Las Vegas, CA (US)

(72) Inventor: Michael Barbera, Las Vegas, CA (US)

( * ) Notice: Subject to any disclaimer, the term of this patent is extended or adjusted under 35 U.S.C. 154(b) by 162 days.

(21) Appl. No.: 14/476,371

(22) Filed: Sep. 3, 2014

(65) Prior Publication Data

US 2016/0063899 A1 Mar. 3, 2016

(51) Int. Cl.
*B65D 83/04* (2006.01)
*G09B 29/00* (2006.01)
*G09B 19/00* (2006.01)
*A61J 7/04* (2006.01)

(52) U.S. Cl.
CPC ............. *G09B 29/001* (2013.01); *A61J 7/04* (2013.01); *G09B 19/003* (2013.01); *A61J 2205/30* (2013.01); *A61J 2205/50* (2013.01)

(58) Field of Classification Search
CPC ..... A61J 7/04; A61J 2205/30; A61J 2205/50; B65D 5/4212; B65D 5/522
USPC .......... 206/232, 459.5, 530, 534, 534.1, 538, 206/539, 570; 434/155, 262, 365, 367, 428
See application file for complete search history.

(56) References Cited

U.S. PATENT DOCUMENTS

| | | | |
|---|---|---|---|
| 3,503,493 A | 3/1970 | Nagy | |
| 4,553,670 A * | 11/1985 | Collens | A61J 1/035 206/534 |
| 4,890,741 A * | 1/1990 | Edelstein | A45C 11/24 206/232 |
| D337,046 S | 7/1993 | Fuller | |
| 5,240,113 A * | 8/1993 | Gibilisco | A61J 1/03 206/534 |
| 5,372,258 A | 12/1994 | Daneshvar | |
| 7,200,071 B2 | 4/2007 | Brophy | |
| D547,052 S | 7/2007 | Cooper | |
| 7,240,793 B2 | 7/2007 | McBain | |
| 7,325,689 B2 | 2/2008 | Buss | |
| 7,419,056 B2 | 9/2008 | Gattefosse et al. | |
| 7,543,718 B2 | 6/2009 | Simon | |
| 7,661,530 B1 | 2/2010 | Hewitt | |
| 7,926,850 B1 | 4/2011 | Muncy | |
| 7,942,451 B2 | 5/2011 | Adler | |
| 8,550,247 B2 | 10/2013 | Stevens et al. | |
| 8,550,248 B1 * | 10/2013 | Busen | A61J 7/0084 206/534 |
| 8,556,077 B1 | 10/2013 | Hanley | |
| 8,567,606 B2 | 10/2013 | Bellamah et al. | |
| 2001/0045373 A1 * | 11/2001 | Peterson | A61J 7/04 206/534 |
| 2002/0117405 A1 | 8/2002 | Wang et al. | |
| 2005/0029156 A1 | 2/2005 | Girzaitis | |
| 2005/0045519 A1 | 3/2005 | Hirsch | |
| 2005/0109658 A1 * | 5/2005 | Bindford | A61J 7/04 206/534 |
| 2005/0218152 A1 | 10/2005 | Simon | |
| 2006/0086640 A1 | 4/2006 | Luciano, Jr. et al. | |
| 2009/0139893 A1 | 6/2009 | McGonagle et al. | |
| 2009/0277815 A1 | 11/2009 | Kohl | |
| 2010/0071320 A1 | 3/2010 | Ali et al. | |
| 2011/0253573 A1 | 10/2011 | Brinker | |
| 2012/0185276 A1 | 7/2012 | Shah | |
| 2013/0281960 A1 | 10/2013 | Hanley | |
| 2013/0299381 A9 | 11/2013 | Luciano, Jr. | |
| 2014/0013710 A1 | 1/2014 | Behman | |

\* cited by examiner

*Primary Examiner* — Luan K Bui
(74) *Attorney, Agent, or Firm* — Tsircou Law, P.C.

(57) ABSTRACT

A patient medication identity display is provided that a matrix of medication slides for displaying a patient's medications in a manner so as to eliminate confusion and avoid preventable prescription errors and consequent harm to patients.

18 Claims, 6 Drawing Sheets

PATIENT MEDICINE IDENTITY DISPLAY

FIELD OF THE INVENTION

The present invention relates generally to medication displays and, more particularly, to such displays that show an actual pill sample adjacent to prescription information within a compact display.

BACKGROUND OF THE INVENTION

In order to give a patient the best possible care, it is imperative for patients, doctors and caregivers to get an accurate history of a patient's medicines. Accurate medication histories help avoid preventable prescription errors and consequent harm to patients. Errors in medication histories can lead to various drug-related problems such as unwanted duplication, dangerous combinations, or improper discontinuation of medicines. They can also cause problems in accurately planning future drug treatment or identifying previous adverse reactions. The more knowledge patients, doctors and caregivers have of a patient's medication history, the better equipped they are to treat the patient more effectively.

However, it can be difficult for caregivers to keep accurate records of an individual's medication history. Patients see different doctors for various ailments and many times, it is challenging these doctors to coordinate and relay all the necessary information. Even in a hospital setting, it is easy for information to fall through the cracks as patients are transferred from one doctor's care to another. Furthermore, these medical professionals often have to rely on what the patient remembers, which can sometimes be problematic.

When a person is ill, that person will often take a variety of medications and it is often difficult for individuals to remember all the details of their past and present medications. Patients frequently struggle to recall the specific dosages or directions that correspond to each medication, or perhaps there are simply too many medications for patients to keep track. Moreover, some ailing patients have diminished capacity and are simply not capable of remembering their medication history.

While there are various products that address the general concepts of storing, organizing, and dispensing medicines, patients still rely primarily on their doctor's records and their own memory for their medication history. As a result, there is a real need for a product that can present a patient's medication history in a manner so as to eliminate confusion and prevent administration of incorrect dosages.

Therefore, there remains a need for means displaying a patient's medications in a manner to eliminate confusion and avoid preventable prescription errors and consequent harm to patients. The present invention fulfills this need and others.

SUMMARY OF THE INVENTION

Briefly, and in general terms, a patient medication identity display is provided that a matrix of medication slides for displaying a patient's medications in a manner so as to eliminate confusion and avoid preventable prescription errors and consequent harm to patients.

More specifically, in an exemplary embodiment, the medication identity display comprises a left panel, a right panel, and a center panel. The center panel is hinged to the left panel along the left longitudinal edge and is hinged to the right panel along the right longitudinal edge. The center panel and the right panel contain a matrix of medication slides that each display a medication sample and prescription information.

In a detailed aspect of an exemplary embodiment, each slide has its own planar base, medication cup, and corresponding informational panel to display prescription information. The slides are held in place by plurality of lateral track pairs fixed to the interior sides of the center panel and the right panel. Each track pair of the plurality having two parallel tracks spaced a fixed distance apart In another detailed aspect of an exemplary embodiment, each slide is sized to be secured by corresponding track pairs such that each can slide laterally in a first direction to be placed within the track pairs and can slide in a second direction to be removed from the track pairs.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
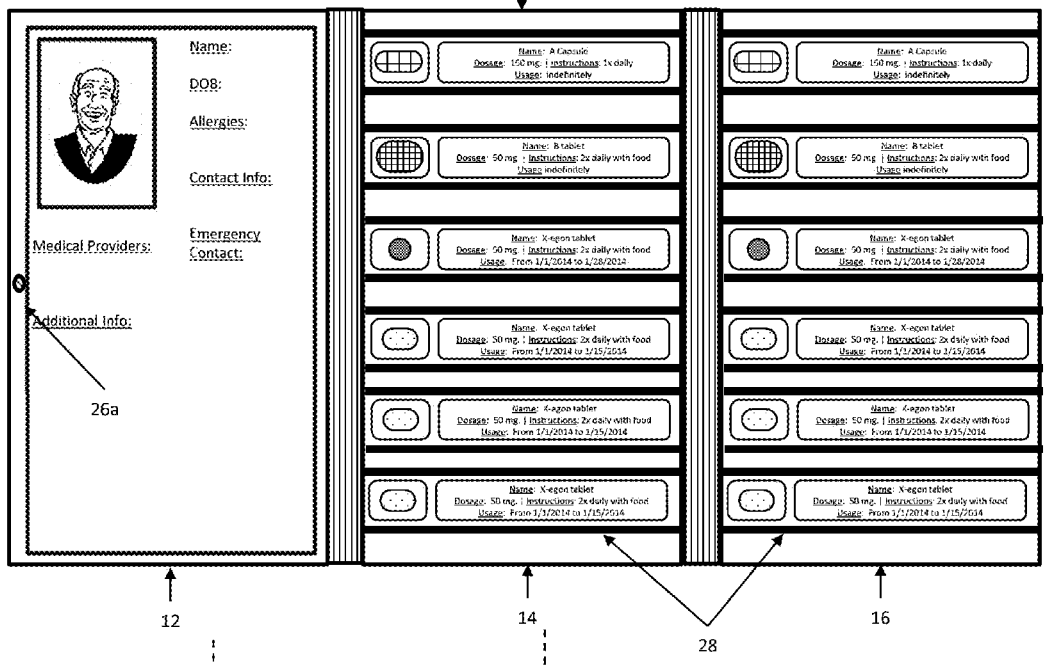
FIG. 1 is a plan view of a patient medication identity display in accordance with the present invention, depicting an interior side having a matrix of medication slides.
Figure 2:
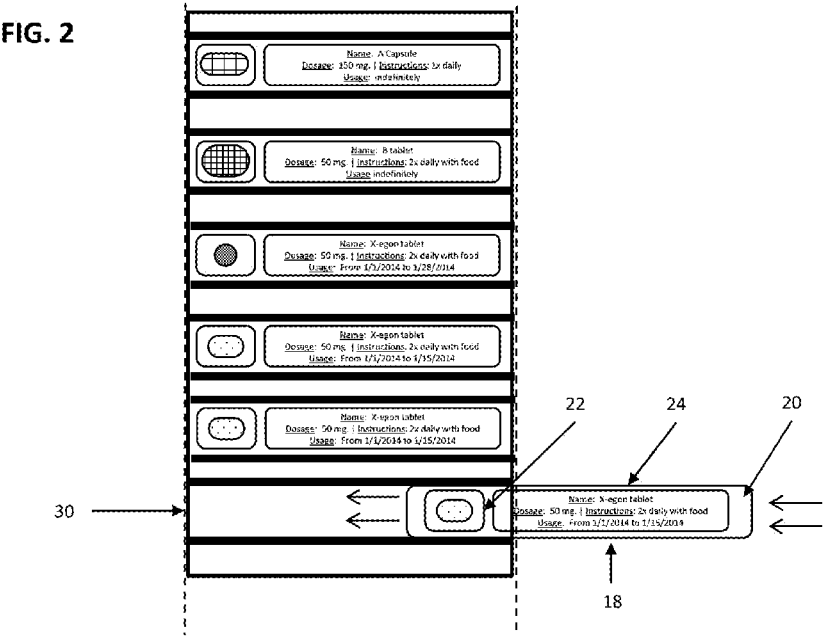
FIG. 2 is a sectional view of the patient medication identity display of FIG. 1, depicting a medication slide being inserted into a pair of tracks.

Referring now to the drawings, and particularly FIG. 1, there is shown an a tri-fold, patient medication identity display 10 with a left panel 12, a center panel 14, and a right panel 16. In an exemplary embodiment, the left panel 12 contains a region for displaying patient information. The center 14 and right 16 panels contain a 2×6 matrix of medication slides 18, each slide having its own planar base 20, medication cup 22, and corresponding informational panel 24 to display prescription information, as shown in FIG. 2. The present invention displays a patient's medications in a manner so as to eliminate confusion and avoid preventable prescription errors and consequent harm to patients.

In an exemplary embodiment, the cover of the display 10 is made of paperboard with a cloth-like material cover. In other anticipated embodiments, the display 10 can be covered with fabrics such as cotton, linen or leather. Alternatively, materials such as plastic, vinyl, or laminate can be used.

The left inside panel 12 contains predefined sections for displaying the patient's information, as shown in FIG. 1. Such information can include: a photo of the patient; other identifying information, such as the patient's name, date of birth, and contact information; and medical information, such as the patient's allergies or contact information of medical providers.

In the present embodiment, the area for displaying the patient's information is made of dry-erase material for easy editing. In other anticipated embodiments, the information can be displayed on a paper insert to be filled out by the patient. Patient information section will be enclosed in a clear, protective window made of clear plastic material.

Figure 4:
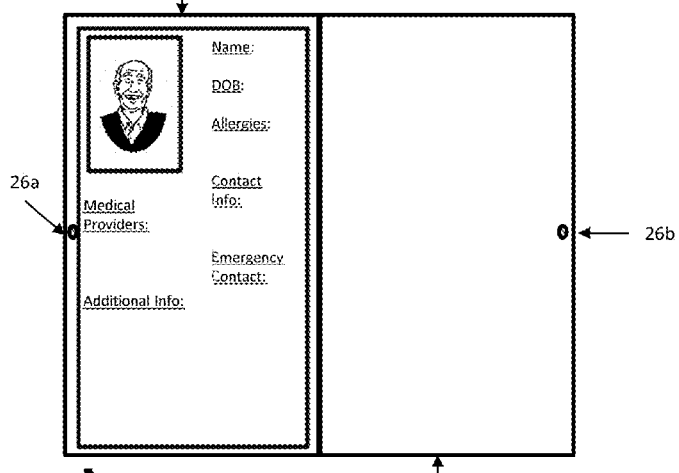
FIG. 4 is a plan view of the of the patient medication identity display of FIG. 1, depicting the right panel folded on top of the center panel.

An attachment mechanism 26a is located on the interior of the left panel 12, as depicted in FIG. 1 and FIG. 4. The other part of the attachment mechanism 26b is located on the exterior of the right panel, shown in FIG. 4. In the exemplary embodiment, the attachment mechanism 26 is a Velcro pad. Other attachment mechanisms 26 can include but are not limited to snap fastener buttons, string and button closures, or string ties.

Figure 6:
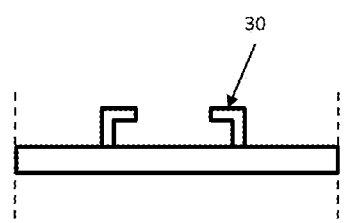
FIG. 6 is a side view of a pair of tracks of the patient medication identity display of FIG. 1.
Figure 7:
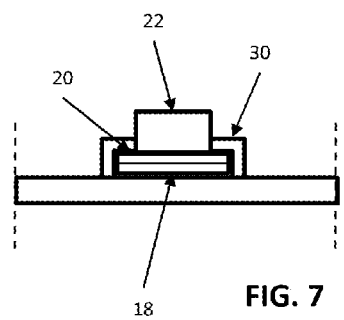
FIG. 7 is a side view of a pair of tracks and a medication slide of the patient medication identity display of FIG. 1.

The center 14 and right 16 panels of the exemplary embodiment have six track pairs 28, each having two parallel tracks 30. FIG. 1 depicts the track pairs 28 on each panel, while FIG. 6 shows a profile view of a track 30. There is one medication slide 18 on each track 30, as shown in FIG. 2. FIG. 7 shows a profile view of the medication slide 18 inside the track 30. In the exemplary embodiment, the tracks 30 are 4¼" long and at 1" parallel separation. In the exemplary embodiment, the tracks 30 are made of plastic. In other embodiments, the track 30 can be made of other materials used in the art.

Each medication slide 18 is made up of a planar base 20, a medication cup 22, and an informational panel 24, as depicted in FIG. 9 through FIG. 12. The planar base 20 is the portion of the slide 18 that can be inserted into the track 30, as shown in FIG. 2 and FIG. 7. In the exemplary embodiment, the base 20 is made of clear plastic. The base can also be made of other materials used in the art.

The medication cup 22 is attached to a lateral edge of the planar base 20. In the exemplary embodiment, the cup 22 is secured permanently to the left edge of the planar base 20. In other embodiments, the cup 22 can be permanently positioned along any part of the planar base 20.

Figure 10:
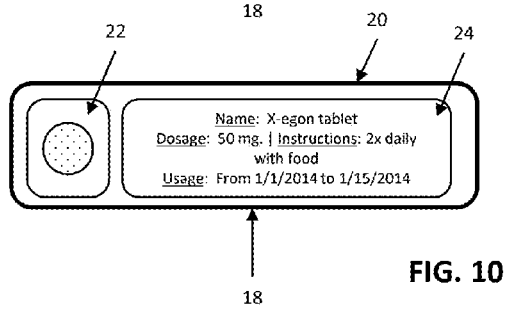
FIG. 10 is a top view of a medication slide of the patient medication identity display of FIG. 1.
Figure 11:
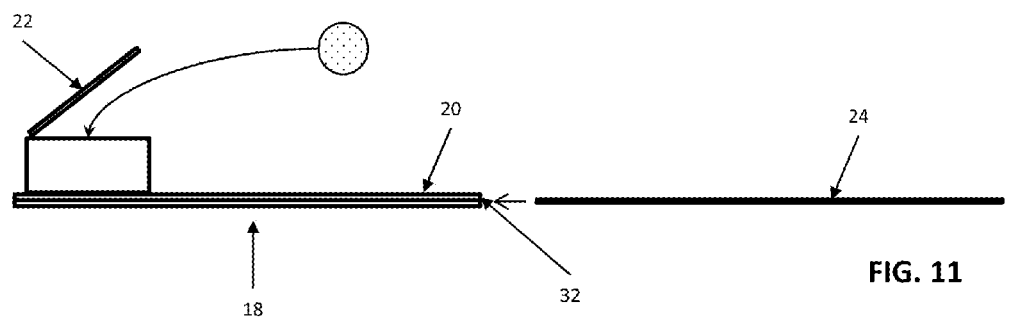
FIG. 11 is a side view of a medication slide of the patient medication identity display of FIG. 1, depicting an informational panel being inserted into a base of the slide and a pill being inserted into the cup.
Figure 12:
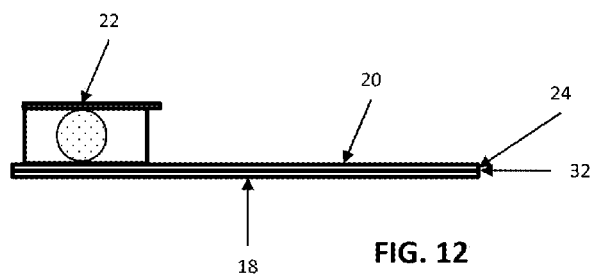
FIG. 12 is a side view of a medication slide of the patient medication identity display of FIG. 1.

The planar base 20 contains a sleeve 32 in which the informational panel 24 may be inserted. This is illustrated by FIG. 10 and FIG. 11. In the exemplary embodiment, the planar base 20 is 5¼"×1" wide.

As shown in FIG. 11, the medication cup 22 is designed to hold a single medication. The medication cups are not intended for dispensing, but rather so, the pill can be viewed for identification purposes. In the exemplary embodiment, the cup 22 is a rectangular, clear, plastic cup. In other anticipated embodiments, the cup 22 may be made of acrylic or another material used in the art and can be circular or square-shaped. The lids may snap, slide or twist open. In the exemplary embodiment, the medication cup 22 dimensions can be ½"-1"×½"×½".

Figure 9:
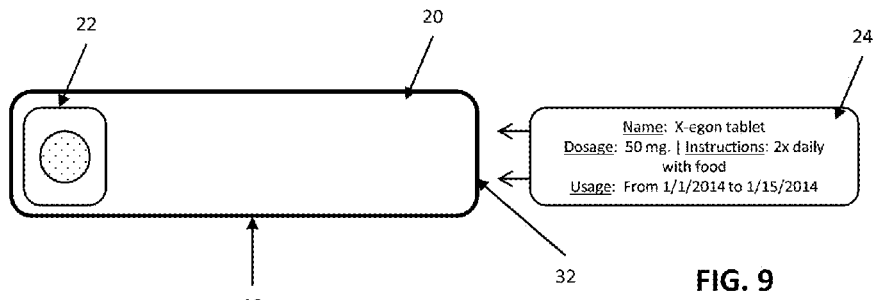
FIG. 9 is a top view of a medication slide of the patient medication identity display of FIG. 1, depicting an informational panel being inserted into a base of the slide.

The informational panel 24 has predefined sections for describing the prescription information of the corresponding medication, as seen in FIG. 9 and FIG. 10. Such information can include the name of the drug, dosage, instructions, and usage. In the present embodiment, the informational panel 24 is a paper insert that can be filled out by the patient or caregiver. In other embodiments, a dry-erase material can be used, as well as pre-printed stickers prepared by pharmacists or other medical professionals.

FIG. 9 and FIG. 11 depict how the informational panel 24 slides into the sleeve 32 of the planar base 20. In an exemplary embodiment, the informational panel 24 is 4¼" long and 1" wide.

FIG. 13 through FIG. 18 show a second embodiment of the medication slide 34. In this second embodiment, each medication slide 34 is made up of a planar base 36, a medication cup 38, and an informational panel 24. The planar base 36 is the portion of the slide 34 that can be inserted into the track 30. In this embodiment, the planar base 36 is made of clear plastic or other materials used in the art and is 5¼"×1" wide.

Figure 13:
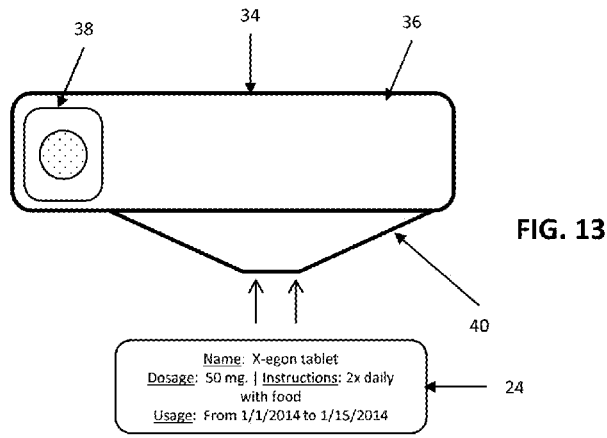
FIG. 13 is a top view of a second embodiment of a medication slide of the patient medication identity display of FIG. 1, depicting an informational panel being inserted into a base of the slide.
Figure 14:
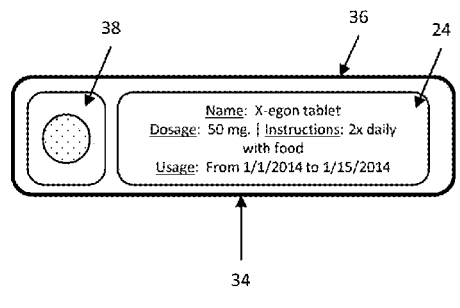
FIG. 14 is a top view of a second embodiment of a medication slide of the patient medication identity display of FIG. 1.
Figure 15:
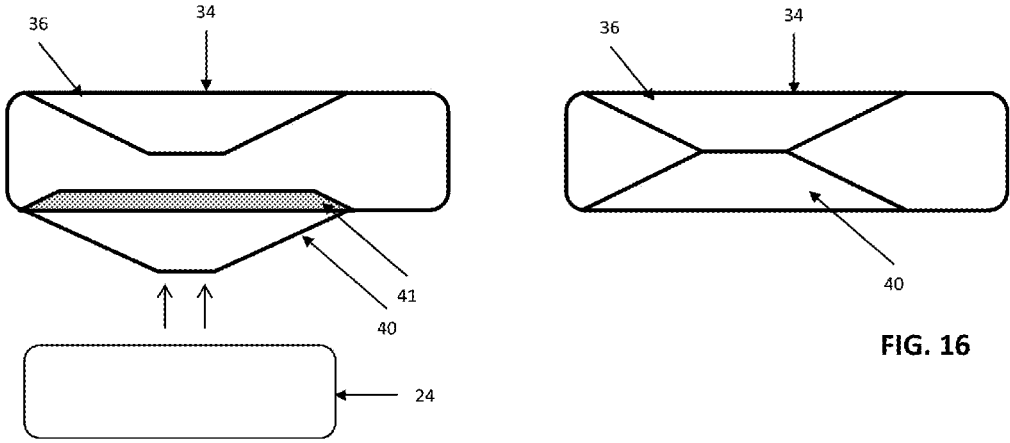
FIG. 15 is a back view of a second embodiment of a medication slide of the patient medication identity display of FIG. 1, depicting an informational panel being inserted into a base of the slide.
Figure 16:
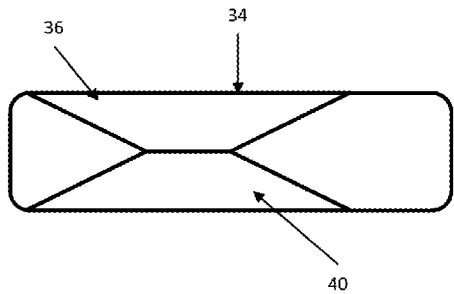
FIG. 16 is a back view of a second embodiment of a medication slide of the patient medication identity display of FIG. 1.
Figure 17:
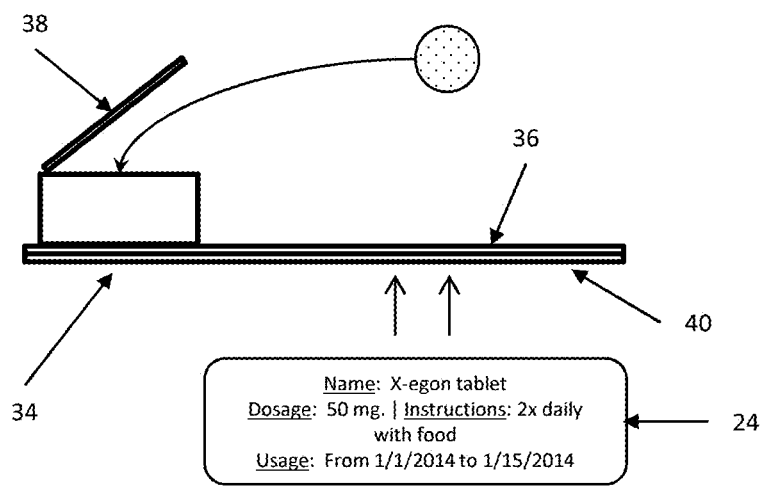
FIG. 17 is a side view of a second embodiment of a medication slide of the patient medication identity display of FIG. 1, depicting an informational panel being inserted into a base of the slide and a pill being inserted into the cup.

In this second embodiment, the back of the planar base 36 has an envelope-like flap 40 in which the informational panel 24 may be inserted, as shown in FIG. 13, FIG. 15, and FIG. 17. The envelope-like flap 40 is connected to a top portion of the base and folds over the bottom longitudinal edge of the base 36. The flap provides access to an interior cavity 41 (FIG. 15) of the planar base for receiving the informational panel 24, as shown in FIGS. 13-16.

FIG. 15 and FIG. 16 show the back view of the medication slide 34 and illustrate the open and closed positions of the flap 40. In this embodiment there is no sealing mechanism; the flap 40 would simply crease shut. The flap 40 would be closed securely when the planar base 36 slides into the track 30.

The medication cup 38 is attached to a lateral edge of the planar base 36. In the exemplary embodiment, the cup 38 is secured permanently to the left edge of the planar base 36. In other embodiments, the cup 38 can be permanently positioned along any part of the planar base 36.

Figure 18:
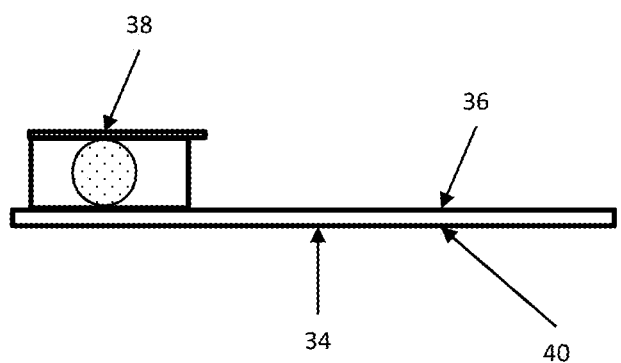
FIG. 18 is a side view of a second embodiment of a medication slide of the patient medication identity display of FIG. 1.

As shown in FIG. 17 and FIG. 18, the medication cup 36 is designed to hold a single medication. The medication cups are not intended for dispensing, but rather so, the pill can be viewed for identification purposes. In the exemplary embodiment, the cup 38 is a rectangular, clear, plastic cup. In other anticipated embodiments, the cup 38 may be made of acrylic or another material used in the art and can be circular or square-shaped. The lids may snap, slide or twist open. In the exemplary embodiment, the medication cup 38 dimensions can be ½"-1"×½"×½".

FIG. 13, FIG. 15, and FIG. 17 depict how the informational panel 24 slides into the envelope-like flap 40 of the planar base 36. In this embodiment, the informational panel 24 is 4¼" long and 1" wide.

Figure 3:
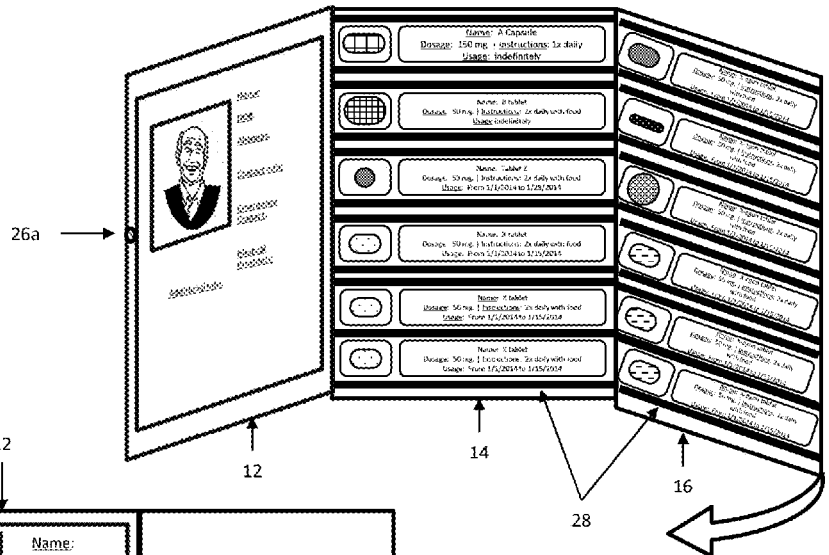
FIG. 3 is a perspective view of the patient medication identity display of FIG. 1, depicting a right panel folded towards a center panel.
Figure 8:
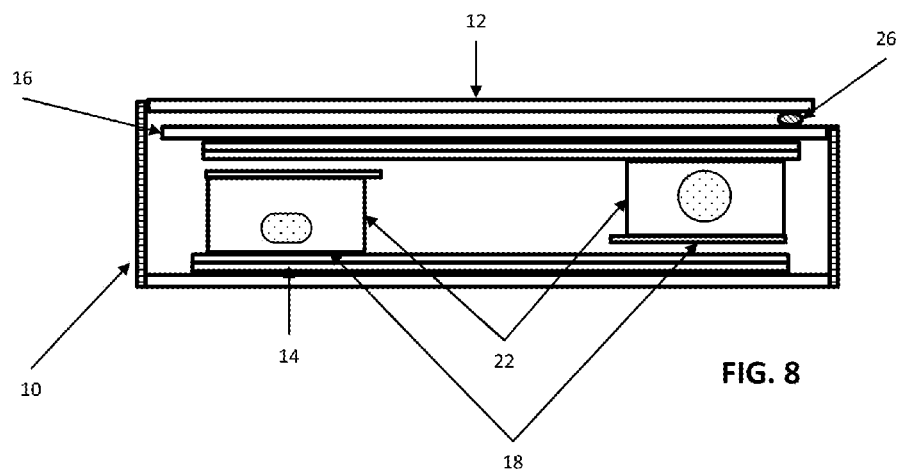
FIG. 8 is a side view of the patient medication identity display of FIG. 1, depicting the display folded closed.

As illustrated by FIG. 1, the center panel 14 is hinged to the left panel 12 along the left longitudinal edge. Similarly, the center panel 14 is hinged to the right panel 16 on the right longitudinal edge. When closing the display 10, the right panel 16 folds over the center panel 14 so that the medication cups 22 on the right panel 16 fold onto the informational panel 24 of the medication slides 18 on the center panel 14, and vice versa. This closure is depicted by FIG. 3 and FIG. 4. FIG. 8 shows a bottom view of the display 10, illustrating the overlap of the medication slides 18 on the center 14 and right 16 panels.

Figure 5:
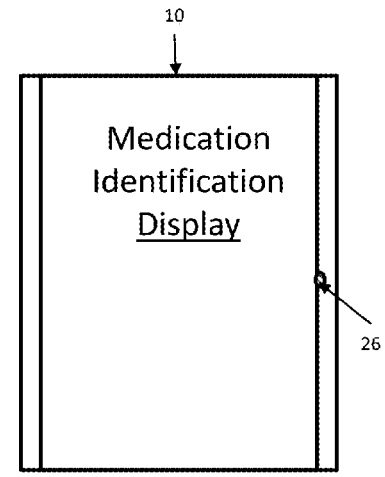
FIG. 5 is a plan view of the of the patient medication identity display of FIG. 1, depicting the display folded closed.

The exterior side of the right panel 16 and the interior side of the left panel 12 have an attachment mechanism 26. In the exemplary embodiment, the attachment mechanism 26 is a hook-and-loop fastener, e.g., Velcro® pad. Other attachment mechanisms 26 can include but are not limited to snap fastener buttons, string and button closures, string ties, among others To completely close the display 10, the left panel 12 would fold over onto the exterior side of the right panel 16 and attach at the attachment mechanism 26a and 26b. This is shown in FIG. 4 and FIG. 5.

It should be appreciated from the foregoing that the present invention provides a way to present a patient's medications in a manner so as to eliminate confusion and avoid preventable prescription errors and consequent harm to patients.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which is to be considered illustrative rather than restrictive.

What is claimed is:

1. A patient medicine identity display, comprising:
A display having a left panel, a right panel, and a center panel having a left longitudinal edge and a right longitudinal edge, the center panel hinged to the left panel along the left longitudinal edge and hinged to the right panel along the right longitudinal edge,
  the left panel having an interior side and an exterior side, the interior side of the left panel including predefined sections for recording patient information, the left panel further having a first portion of an attachment mechanism,
  the center panel having an interior side and an exterior side,
  the right panel having an interior side and an exterior side, and a plurality of lateral track pairs fixed to the interior sides of the center panel and the right panel, each track pair of the plurality track pairs having two parallel tracks spaced a fixed distance apart; and
  a plurality of medication slides, each slide having a planar base, a medication cup, and an informational panel, each slide is sized to be secured by a corresponding track pair such that each slide can slide laterally in a first direction to be placed within the track pair and can slide in a second direction to be removed from the track pair,
  the planar base of each slide having two spaced-apart longitudinal edges and two spaced-apart lateral edge, the planar base defines a sleeve to receive the informational panel,
  the medication cup of each slide secured to the planar base proximate to a lateral edge, the medication cup sized to receive a single medication, and
  the informational panel of each slide including predefined sections for details of the corresponding medication.

2. A medication identity display as described in claim 1, wherein the center panel includes at least four lateral track pairs.

3. A medication identity display as described in claim 1, wherein the right panel includes at least four lateral track pairs.

4. A medication identity display as described in claim 1, wherein each informational panel of the plurality of medication slides includes sections for drug, dosage, instructions, and usage.

5. A medication identity display as described in claim 1, wherein each medication cup of plurality of medication slides comprises a snap-fit lid.

6. A medication identity display as described in claim 1, wherein each medication cup of plurality of medication slides is disposed proximate to the left end of the slide.

7. A medication identity display as described in claim 1, wherein the left inside panel contains predefined sections for displaying patient's information.

8. A medication identity display as described in claim 7, wherein the predefined sections includes a photo of the patient, name, date of birth, contact information, allergies, and contact information of medical providers.

9. A medication identity display as described in claim 1, wherein the first portion of the attachment mechanism is located on an interior of the left panel and mates with a second portion of the attachment mechanism located on an exterior of the right panel.

10. A patient medicine identity display, comprising:
a display having a left panel, a right panel, and a center panel having a left longitudinal edge and a right longitudinal edge, the center panel hinged to the left panel along the left longitudinal edge and hinged to the right panel along the right longitudinal edge,
the left panel having an interior side and an exterior side, the interior side of the left panel including predefined sections for recording and displaying patient information, the left panel further having a first portion of an attachment mechanism, the predefined sections includes a photo of the patient, name, date of birth, contact information, allergies, and contact information of medical providers,
the center panel having an interior side and an exterior side,
the right panel having an interior side and an exterior side, and a plurality of lateral track pairs fixed to the interior sides of the center panel and the right panel, each track pair of the plurality track pairs having two parallel tracks spaced a fixed distance apart; and a plurality of medication slides, each slide having a planar base, a medication cup, and an informational panel, each slide is sized to be secured by a corresponding track pair such that each slide can slide laterally in a first direction to be placed within the track pair and can slide in a second direction to be removed from the track pair, the planar base of each slide having two spaced-apart longitudinal edges and two spaced-apart lateral edge, the planar base defines a sleeve to receive the informational panel, the medication cup of each slide secured to the planar base proximate to a lateral edge, the medication cup sized to receive a single medication, each medication cup of plurality of medication slides is disposed proximate to the left end of the slide, and the informational panel of each slide including predefined sections for details of the corresponding medication.

11. A medication identity display as described in claim 10, wherein the center panel includes at least four lateral track pairs.

12. A medication identity display as described in claim 10, wherein the right panel includes at least four lateral track pairs.

13. A medication identity display as described in claim 10, wherein each informational panel of the plurality of medication slides includes sections for drug, dosage, instructions, and usage.

14. A medication identity display as described in claim 10, wherein each medication cup of plurality of medication slides comprises a snap-fit lid.

15. A medication identity display as described in claim 10, wherein the first portion of the attachment mechanism is located on an interior of the left panel and mates with a second portion of the attachment mechanism located on an exterior of the right panel.

16. A patient medicine identity display, comprising:

a display having a left panel, a right panel, and a center panel having a left longitudinal edge and a right longitudinal edge, the center panel hinged to the left panel along the left longitudinal edge and hinged to the right panel along the right longitudinal edge, the left panel having an interior side and an exterior side, the interior side of the left panel including predefined sections for recording and displaying patient information, the left panel further having a first portion of an attachment mechanism, the predefined sections includes a photo of the patient, name, date of birth, contact information, allergies, and contact information of medical providers, the center panel having an interior side and an exterior side, the right panel having an interior side and an exterior side, and a plurality of lateral track pairs fixed to the interior sides of the center panel and the right panel, each track pair of the plurality track pairs having two parallel tracks spaced a fixed distance apart;

the first portion of the attachment mechanism is located on an interior of the left panel and mates with a A second portion of the attachment mechanism located on an exterior of the right panel; and a plurality of medication slides, each slide having a planar base, a medication cup, and an informational panel, each slide is sized to be secured by a corresponding track pair track such that each slide can slide laterally in a first direction to be placed within the track pair and can slide in a second direction to be removed from the track pair, the planar base of each slide having two spaced-apart longitudinal edges and two spaced-apart lateral edge, the planar base defines a sleeve to receive the informational panel, the medication cup of each slide secured to the planar base proximate to a lateral edge, the medication cup sized to receive a single medication, each medication cup of the plurality of medication slides is disposed proximate to the left end of the slide, and the informational panel of each slide including predefined sections for details of the corresponding medication, including sections for drug, dosage, instructions, and usage.

17. A medication identity display as described in claim 16, wherein the center panel includes at least four lateral track pairs.

18. A medication identity display as described in claim 16, wherein the right panel includes at least four lateral track pairs.

* * * * *